United States Patent [19]

Johnson

[11] Patent Number: 4,821,931
[45] Date of Patent: Apr. 18, 1989

[54] MULTIPURPOSE ARTICLE HOLDING TRAY

[76] Inventor: Richard E. Johnson, 3304 39th Ave., NE., Minneapolis, Minn. 55421

[21] Appl. No.: 61,216

[22] Filed: Jun. 12, 1987

[51] Int. Cl.$^4$ ............................................... B60R 7/00
[52] U.S. Cl. ................................... 224/42.42; 206/387; 220/23.86; 224/311; 224/901
[58] Field of Search ............ 224/42.42, 275, 901, 224/273, 42.43, 42.44, 311; 108/44; 296/37.1, 37.8; 206/387, 501; 220/23.86, 22; 24/682, 700

[56] References Cited

U.S. PATENT DOCUMENTS

| | | | |
|---|---|---|---|
| 3,022,883 | 2/1962 | Barton, Jr. et al. | 224/42.42 R |
| 3,109,537 | 11/1963 | Larkin | 224/42.42 R |
| 3,110,397 | 11/1963 | Peck et al. | 224/42.42 R |
| 3,156,962 | 11/1964 | Henson | 24/682 |
| 3,187,518 | 6/1965 | Bair et al. | 206/514 X |
| 3,213,507 | 10/1965 | Christian et al. | 24/682 X |
| 3,241,706 | 3/1966 | Monaco et al. | 108/44 X |
| 3,315,798 | 4/1967 | Mathison | 224/42.42 R |
| 3,357,614 | 12/1967 | Berg | 224/273 |
| 3,416,200 | 12/1968 | Daddona, Jr. | 24/580 |
| 3,610,459 | 10/1971 | Hanson | 220/23.83 |
| 3,800,939 | 4/1974 | Cornelius | 224/901 X |
| 3,804,233 | 4/1974 | Gregg, Jr. | 224/273 |
| 3,916,756 | 11/1975 | Yoda | 24/682 |
| 4,534,474 | 8/1985 | Ng | 206/514 X |
| 4,643,312 | 2/1987 | Zarges | 206/501 X |

FOREIGN PATENT DOCUMENTS 1254287 11/1971 United Kingdom ............... 206/514

Primary Examiner—Stephen Marcus
Attorney, Agent, or Firm—Peterson, Wicks, Nemer & Kamrath

[57] ABSTRACT

A multipurpose article holding tray is disclosed for use in an automobile body including a container for removable interfitting within a traylike receptacle. The container is divided into compartments for receipt of litter, liquid beverage containers, note paper, and pencils. In the preferred form, the receptacle includes dividers for holding cassette tapes. The receptacle includes a skirtlike marginal rim which defines the recess for removably holding the container and which includes sets of convex lower marginal edges in the end walls and in the side walls for straddling the tunnel hump of an automobile body of various sizes. The receptacle is removably held to the automobile body against displacement by forces caused by movement and/or jarring of the automobile body by studs depending from the bottom wall of the receptacle which are gripped by an element secured to the automobile body such as by adhesive. In the preferred form, the gripping element includes apertures of a size and shape complementary to and for a gripping and frictional interrelation with the studs of the receptacle.

15 Claims, 2 Drawing Sheets

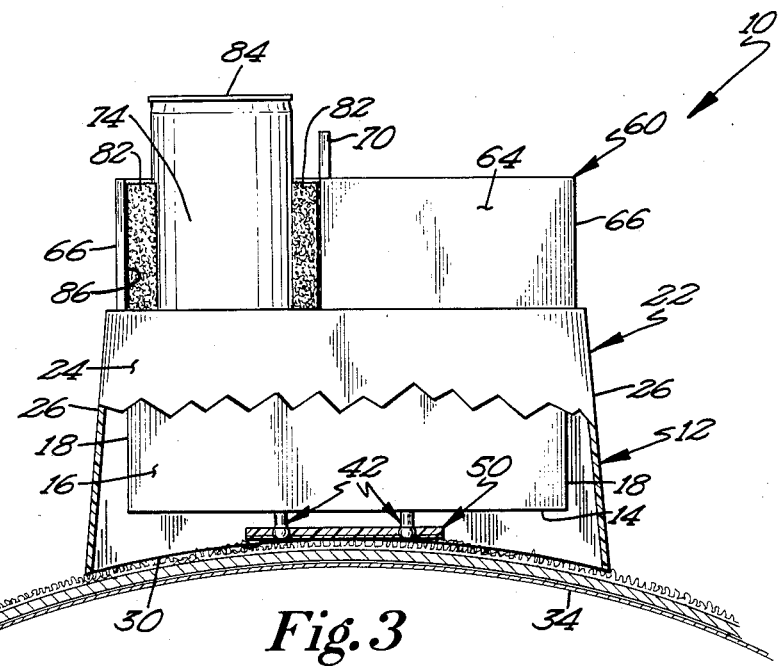
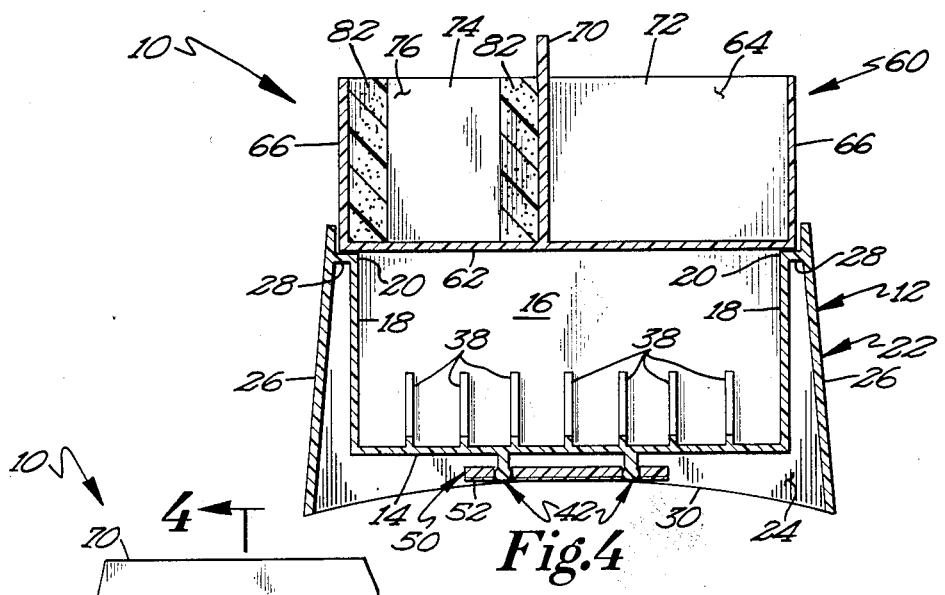
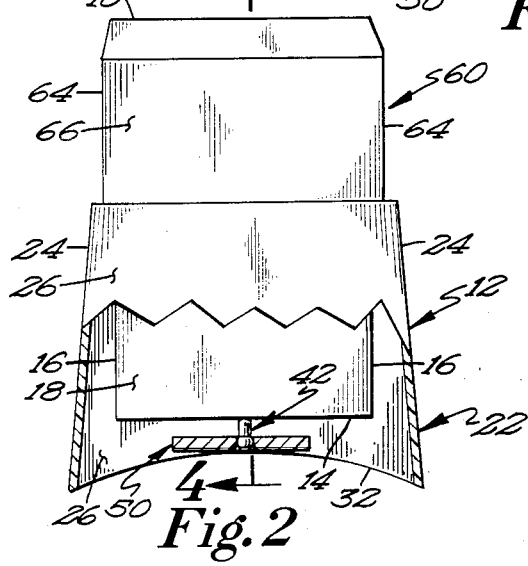
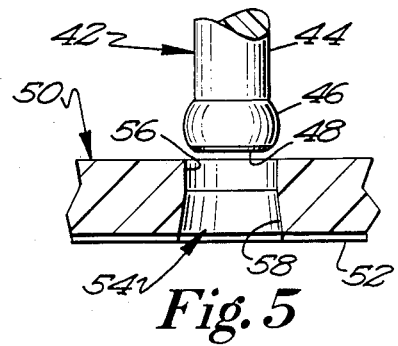

MULTIPURPOSE ARTICLE HOLDING TRAY

BACKGROUND

The present invention relates generally to trays, particularly to multipurpose article holding trays, and specifically to multipurpose article holding trays for use in automobile bodies and in the preferred form for attachment to the tunnel hump of automobile bodies.

Since the advent of the automobile, a need has existed to hold a variety of articles and materials in an organized fashion adjacent to the driver or passengers. This need has further increased with the advent of tape and disc players for the automobile where it is necessary for the driver to locate and change discs or tapes in the player while driving the automobile. Further, a need has arisen to prevent such articles from being displaced by forces due to automobile movement such as accelerating, decelerating, and cornering and due to road jarring and vibrations. Such a need is especially important when the article to be held consists of an open liquid container which could spill its contents in the automobile body. Additionally, it is generally desirable to locate the articles in the area of the tunnel hump of the automobile as this is an area which is the most uncomfortable for the seating of passengers. However, articles located on the tunnel hump, but its nature, are especially prone to displacement. Furthermore, a need has arisen to allow the ready removal of trays for holding articles for cleaning purposes, to allow seating for passengers, and like reasons.

SUMMARY

The present invention solves these and other needs and problems by providing a multipurpose article holding tray for use in an automobile body including, in the preferred form, a unique manner for removably holding a traylike receptacle to the automobile body against displacement by forces caused by movement or jarring of the automobile body. In the most preferred form, studs are provided integrally formed with the bottom wall of the traylike receptacle which are removably gripped by an element secured to the automobile body.

It is thus an object of the present invention to provide such a novel tray.

It is further an object of the present invention to provide such a novel tray for use in an automobile body.

It is further an object of the present invention to provide such a novel tray for holding a variety of articles and/or materials in an organized fashion.

It is further an object of the present invention to provide such a novel tray which is removably held against unwanted displacement.

It is further an object of the present invention to provide such a novel tray which is removably held adjacent to the passengers and driver of an automobile.

It is further an object of the present invention to provide such a novel tray adapted for removable securement to the tunnel hump of an automobile body.

It is further an object of the present invention to provide such a novel tray which is advantageous in regard to its ease and cost of manufacture.

It is further an object of the present invention to provide such a novel tray having a different, unique, and advantageous construction.

It is further an object of the present invention to provide such a novel tray including a traylike receptacle and a container removably interfitted therein.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows an end view of the multipurpose article holding tray of FIG. 1 with portions thereof being broken away.

FIG. 3 shows a side view of the multipurpose article holding tray of FIG. 1 with portions thereof being broken away.

FIG. 4 shows a cross-sectional view of the multipurpose article holding tray of FIG. 1 according to section line 4—4 of FIG. 2.

FIG. 5 is an enlarged view of portions of the multipurpose article holding tray of FIG. 1.

Figure 1:
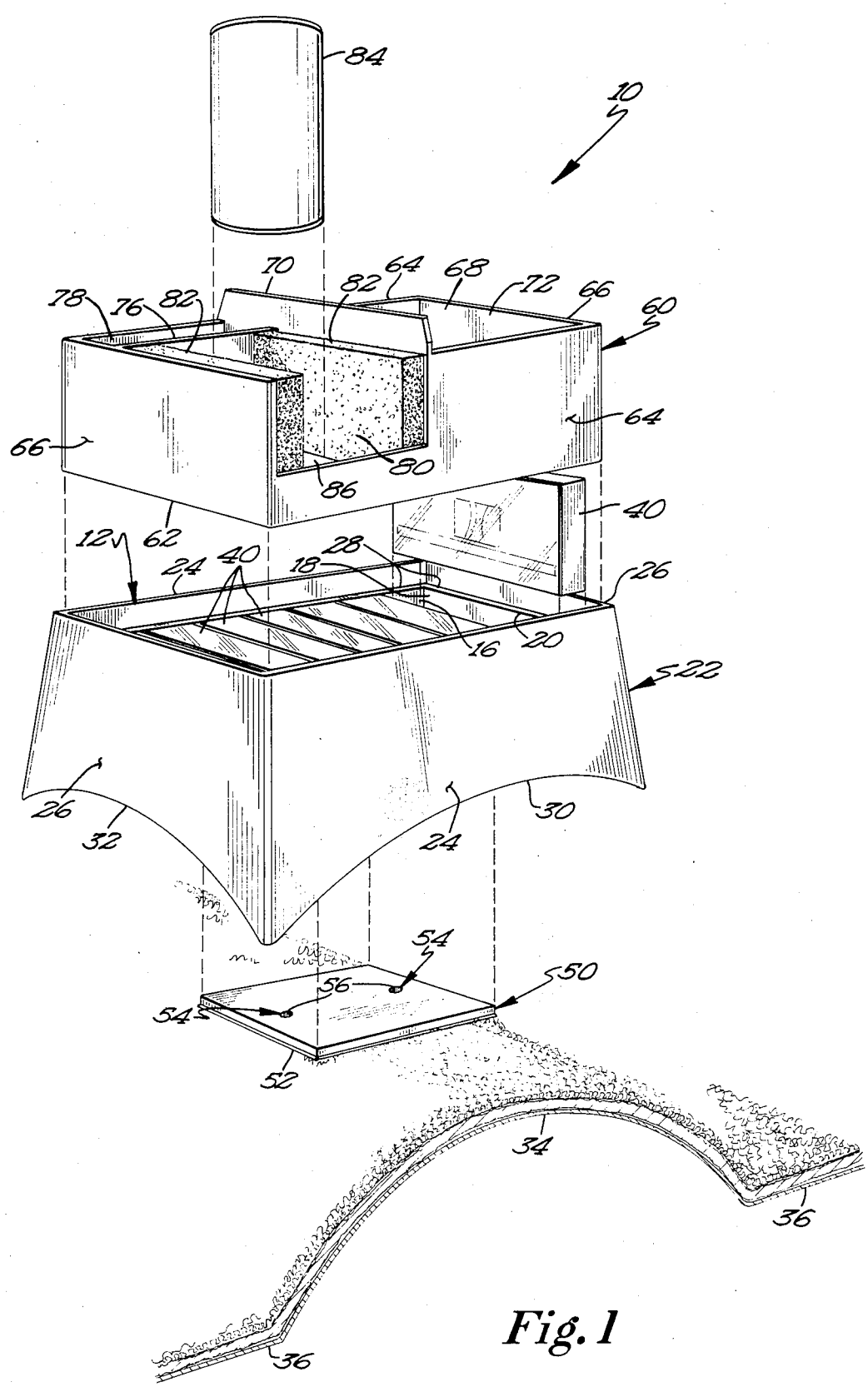
FIG. 1 shows an exploded perspective view of a multipurpose article holding tray for use with an automobile body according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "side", "end", "inside", "outside", and similar terms are used herein, it should be understood that these terms have reference only to the structure shown in the drawings as it would appear to a person viewing the drawings and are utilized only to facilitate describing the invention.

DESCRIPTION

A multipurpose article holding tray according to the teachings of the present invention is shown in the drawings in its most preferred form for use in an automobile body and is generally designated 10. Tray 10 is formed in its preferred form of molded plastic and generally includes a traylike receptacle 12. Receptacle 12 is generally box shaped and includes a bottom wall 14, side walls 16, and end walls 18. Walls 16 and 18 upstand from bottom wall 14 and their upper ends define an open top 20. In its most preferred form, the top surface of bottom wall 14 and the inside surfaces of side walls 16 of receptacle 10 include spaced, upstanding, integral dividers 38 for removable receipt of articles 40 such as cassette tapes.

In its most preferred form, tray 10 further includes a depending skirt-like marginal rim 22 characterized by opposite longitudinal side walls 24 and interconnecting transverse end walls 26. Rim 22 is secured to receptacle 12 by a transverse connection 28 extending generally perpendicularly from the upper ends of walls 16 and 18 of receptacle 12 to the side walls 24 and end walls 26 of rim 22 below their upper ends to define a container receiving recess.

Side walls 24 include convex lower marginal edges 30. Likewise, end walls 26 include convex lower marginal edges 32. Edges 30 and 32 are disposed beneath bottom wall 14 of receptacle 12 and are adapted to rest upon the convex surface of an automobile vehicle tunnel hump 34 of an automobile body 36. In the most preferred form, edges 30 and 32 are of different sizes to allow tray 10 to accomodate various sizes of tunnel humps 34 by setting tray 10 to straddle hump 34 between edges 30 of side walls 24 or to straddle hump 34 between edges 32 of end walls 26.

According to the teachings of the present invention, studs 42 are provided integrally formed with and depending generally perpendicularly from the bottom surface of bottom wall 14 of receptacle 12. In their most preferred form, studs 42 include a first, generally cylindrical portion 44 having a circular cross section having a diameter. The first end of portion 44 is integrally formed with bottom wall 14 of receptacle 12 and the second end of portion 44 terminates in and is integrally connected to a second, generally spherical portion 46 having a diameter greater than the diameter of cylindrical portion 44. Portion 46 in its most preferred form includes a flat surface 48 which is generally parallel to the plane of the intersection or interconnection of portions 44 and 46, is generally perpendicular to the axis of portion 44, and is on the opposite side and equidistant the center of portion 48 from the interconnection of portions 44 and 46.

According to the teachings of the present invention, tray 10 further includes a gripping element 50 which is secured to hump 34 of automobile body 36 such as by double-sided adhesive 52. Gripping element 50 includes provisions 54 for removably gripping or frictionally receiving studs 42. In a preferred form, provisions 54 include apertures for removable, securable receipt of studs 42. In their most preferred form, apertures 54 include a first, generally cylindrical portion 56 having a shape and size complementary to and for removable receipt of cylindrical portion 44 and for the passage of portion 46 therethrough, with portion 56 terminating in and interconnected to a second, frusto-conical portion 58 having a major base with a diameter greater than the diameter of cylindrical portion 56 and a minor base having a diameter equal to the diameter of cylindrical portion 56. In its most preferred form, the diameter of the minor base of portion 58 and the diameter of portion 56 are generally equal to but slightly larger than the diameter of portion 46 of studs 42, and the diameter of the major base of portion 58 is slightly larger than the diameter of portion 46 of studs 42. To further assist the gripping and frictional interrelation of studs 42 within apertures 54, element 50 may be formed of leather and like materials which tend to cling or stick to studs 42.

In the most preferred form, tray 10 further includes a container 60. Container 60 is generally box shaped and includes a bottom wall 62, side walls 64, and end walls 66. Walls 64 and 66 upstand from bottom wall 62, and their upper ends define an open top 68. Bottom wall 62 and container 60 have a size and shape complementary to and for receipt in the container receiving recess defined by the upper ends of walls 24 and 26 of rim 22 in an interfitting manner.

In the most preferred form, container 60 includes a partition 70 extending between side walls 64 dividing container 60 into a first chamber 72 and a second chamber 74. In its preferred form, chamber 72 may be utilized for holding litter, refuse, or other articles. Second chamber 74 is divided by a divider 76 into a first subchamber 78 for holding note paper, pencils, or other articles and a second subchamber 80 including provisions 82 such as compressible foam for removably receiving a liquid container 84 such as a soft drink can, coffee mug, or the like. To allow ease of insertion and removal of container 84, removed portion 86 can be provided in side wall 64 of container 60. In its preferred form, partition 70 extends beyond the upper ends of side walls 64 and end walls 68 for forming a handle portion to allow carrying of container 60 by the fingers of the user.

Now that the basic construction of tray 10 according to the teachings of the present invention has been explained, the use and subtle features of the present invention can be set forth and appreciated. Specifically, in use, gripping element 50 is secured to automobile body 36 by any suitable method such as by the use of adhesive 52 as in the preferred embodiment of the present invention. In the most preferred from, tray 10 is especially adapted to be secured to tunnel hump 34 due to the provision of edges 30 and 32 of rim 22, but it can be appreciated that tray 10 can fit on other surfaces and rest upon the corners of walls 24 and 26 intermediate edges 30 and 32. After securement of gripping element 50, receptacle 12 may be positioned such that studs 42 are vertically aligned with apertures 54 and then pushed therein. Studs 42 are then gripped and/or frictionally held in apertures 54 such that receptacle 12 is securely held against displacement. Container 60 may be positioned within the container receiving recess defined by the upper ends of walls 16 and 18 of rim 22. It can then be appreciated that due to the complementary size and shape and due to the interfitting nature of container 60 with respect to the recess of rim 22, container 60 is removably held against displacement from receptacle 12 and from automobile body 36. If it is desired to remove receptacle 12 from automobile body 36 such as for example to empty receptacle 12 or if it is not desired to utilize tray 10 in automobile body 36, it is only necessary to lift receptacle 12 such that studs 42 are physically pulled from apertures 54. It can then be appreciated that receptacle 12 can be positioned or removed from gripping element 50 with container 60 either positioned within or removed from the recess of rim 22.

Retention of automotive article holding trays on the tunnel hump against displacement by forces due to automobile movement, i.e., acceleration, deceleration, and cornering of the automobile, due to road jarring and vibration, and due to similar causes is a well-known problem. Many devices of varying design have been provided to retain such trays, some of them adapted to be affixed in some fashion to the automobile body itself, while others merely rest upon the car seat, floor, or the like with some including weights or other movement prevention means. While tray 10 according to the preferred form of the present invention is especially adapted to ride the automobile body tunnel hump 34, tray 10 employs a different, unique and advantageous construction.

Particularly, the manner in which receptacle 12 is held to automobile body 36 and tunnel hump 34 in its most preferred form is believed to be advantageous.

Specifically, tray 10 includes studs 42 and gripping element 50 secured to automobile body 36 for removably holding receptacle 12 against displacement. Specifically, tray 10 according to the teachings of the present invention is prevented by the fixed securement of gripping element 50 to automobile body 36 from sliding, moving, or otherwise being displaced by forces due to automobile movement, road jars, or similar causes as prior devices which were not secured to automobile body 36 are prone to do. Further, due to the removable nature of studs 42 from gripping element 50, tray 10 according to the teachings of the present invention allows removal of receptacle 12 when it is not desired to be used, when it is desired to empty receptacle 12 by tipping receptacle 12, and under similar circumstances which was prevented in prior devices which were secured to the automobile body 36. It can then be appreciated that tray 10 according to the teachings of the present invention is particularly advantageous in regard to its very secure attachment to automobile body 36 for holding against displacement while still allowing easy removal and replacement.

Further, tray 10 is further advantageous in regard to its ease and cost of manufacture. Particularly, tray 10 includes 3 components which are molded from plastic as single pieces which require minimum assembly and touch up after removal from the mold to its final, market ready condition. Thus, the overhead and cost of manufacture is reduced utilizing the preferred construction of the present invention.

Additionally, with container 60 received in the container receiving recess of receptacle 12, container 60 visually covers articles 40 such as cassette tapes according to the teachings of the present invention such that a potential burglar cannot see them. With articles 40 visually exposed as in prior devices, a potential burglar may have more incentive to break in the automobile knowing the particular articles inside.

Similarly, receptacle 12 and container 60 provide multiple type and function chambers for holding a variety of articles and materials present in an automotive environment in an organized fashion adjacent to the driver or passengers in the automobile. It is then believed that the particular construction of receptacle 12 and container 60 is particularly advantageous over prior trays. Further, it can be appreciated that tray 10 according to the teachings of the present invention may be marketed as including or not including container 60 without requiring modifications to receptacle 12 such that the consumer has a choice in the marketplace as to the extent and degree of article organization and storage desired without requiring the manufacturer to have multiple designs and contructions, each having their own overhead, inventory, or like costs.

It can be appreciated that gripping element 50 can be positioned at any desired location in automobile body 36 according to the teachings of the present invention. Further, several gripping elements 50 can be provided at different locations in automobile body 36 such as in front of the front seat, in front of the back seat, and in the trunk allowing tray 10 to be removably held against displacement in any of these positions.

Now that the basic teachings of the present invention have been explained, many extensions and variations will be obvious to one having ordinary skill in the art. For example, although the teachings of the present invention have been set forth in regard to a tray 10 of a unique and different construction, it can be appreciated that the removably holding manner of the present invention may be utilized with prior tray designs and constructions. In fact, the teachings of the present invention may be applied to prior tray designs, and possibly even in a retrofit manner. Particularly, prior tray designs often included flexible straps underlying the container portion which were held thereon by friction nuts received on depending studs. It can then be realized that a gripping element 50 according to the teachings of the present invention may be provided for removably gripping and/or frictionally interrelating with such studs, with the flexible straps in place or removed from such prior tray designs.

Although gripping element 52 is shown as secured by adhesive 52 in the most preferred form, other manner and types of securement such as a fabric hook and loop type fastener of the type sold under the trademark "VELCRO" may be utilized in conjunction with the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Multipurpose article holding tray for use in an automobile body including a tunnel hump comprising, in combination: a traylike receptacle for holding articles, with the traylike receptacle including an open top and a bottom wall having a top surface and a bottom surface; a skirt-like marginal rim; means for connecting the skirt-like marginal rim to the open top of the traylike receptacle, with the skirt-like marginal rim including an upper end extending generally above the open top of the traylike receptacle defining a container receiving recess having a size and shape; a container having a size and shape complementary to and for interfitting within the container receiving recess of the traylike receptacle for removably holding the container to the traylike receptacle against displacement by forces caused by movement or jarring of the automobile body; convex lower marginal edges formed on the skirt-like marginal rim adapted to rest upon the tunnel hump of the automobile body; and means for removably holding the traylike receptacle to the automobile body against displacement by forces caused by movement and jarring of the automobile body, with the removably holding means comprising, in combination: at least a first stud integrally formed with the bottom wall of the traylike receptacle and extending generally perpendicularly to the bottom surface, with the stud comprising, in combination: a generally cylindrical portion having a first end, a second end, and a diameter, with the first end of the generally cylindrical portion being integrally formed with the bottom wall of the traylike receptacle, and a generally spherical portion connected to the second end of the generally cylindrical portion, with the generally spherical portion having a diameter larger than the diameter of the generally cylindrical portion; a gripping element; at least a first aperture formed in the gripping element having a size and shape for removable, securable receipt of the stud of the traylike receptacle; with the aperture comprising, in combination: a first portion having a generally cylindrical shape having a diameter slightly larger than the diameter of the generally cylindrical portion of the stud for passage of the generally cylindrical portion of the stud therethrough and a second portion including a frusto-conical shape having a major base with a diameter larger than the diameter of the first portion and a minor base with a diameter generally equal to the diameter of the first portion for removable, securable receipt of the generally spherical portion of the stud, with the first portion of the aperture interconnected to the second portion of the aperture at the minor base; and means for securing the gripping element to the automobile body.

2. Multipurpose article holding tray for use in an automobile body comprising, in combination: a traylike receptacle for holding articles, with the traylike receptacle including a bottom wall having a top surface and a bottom surface; and means for removably holding the traylike receptacle to the automobile body against displacement by forces caused by movement and jarring of the automobile body, with the removably holding means comprising, in combination: at least a first stud integrally formed with the bottom wall of the traylike receptacle and extending generally perpendicularly to the bottom surface, with the stud comprising, in combination: a generally cylindrical portion and a generally spherical portion, with the generally cylindrical portion having a first end, a second end, and a diameter, with the first end of the generally cylindrical portion being integrally formed with the bottom wall of the traylike receptacle, with the generally spherical portion connected to the second end of the generally cylindrical portion, with the generally spherical portion having a diameter larger than the diameter of the generally cylindrical portion; a gripping element; and at least a first aperture formed in the gripping element and having a first portion and a second portion, with the first portion of the aperture having a generally cylindrical shape including a constant diameter slightly larger than the diameter of the generally cylindrical portion of the stud, with the second portion of the aperture interconnected to the first portion and having a frusto-conical shape including a major base with a diameter larger than the diameter of the first portion and a minor base with a diameter generally equal to the diameter of the first portion, with the first portion of the aperture interconnected to the second portion of the aperture at the minor base; and means for securing the gripping element to the automobile body.

3. The multipurpose article holding tray of claim 2 wherein the securing means comprises adhesive secured to the removably gripping means and the automobile body.

4. The multipurpose article holding tray of claim 2 wherein the traylike receptacle is generally box shaped and includes side walls and end walls upstanding from the bottom wall, with the side walls having an inside surface; and wherein the traylike receptacle further comprises, in combination: means for removably receiving a plurality of cassette tapes.

5. The multipurpose article holding tray of claim 2 further comprising, in combination: a skirt-like marginal rim, with the traylike receptacle including an open top; and means for connecting the skirt-like marginal rim to the open top of the traylike receptacle.

6. The multipurpose article holding tray of claim 5 wherein the automobile body includes a tunnel hump; and wherein the skirt-like marginal rim comprises, in combination: first and second end walls; first and second side walls; convex lower marginal edges formed on the first and second end walls adapted to rest upon the tunnel hump of the automobile body; convex lower marginal edges formed on the first and second side walls adapted to rest upon the tunnel hump of the automobile body; with the convex lower marginal edges of the end walls and of the side walls being of different sizes to allow the traylike receptacle to accommodate various sizes of tunnel humps by positioning the traylike receptacle to straddle the tunnel hump between the convex lower marginal edges of the end walls and by positioning the traylike receptacle to straddle the tunnel hump between the convex lower marginal edges of the side walls.

7. The multipurpose article holding tray of claim 5 wherein the skirt-like marginal rim includes an upper end extending generally above the open top of the traylike receptacle defining a container receiving recess having a size and shape; and wherein the multipurpose article holding tray further comprises, in combination: a container having a size and shape complementary to and for interfitting within the container receiving recess of the traylike receptacle for removably holding the container to the traylike receptacle against displacement by forces caused by movement or jarring of the automobile body, with the container receiving recess holding the container above the articles in the traylike receptacle allowing the traylike receptacle to hold articles therein while the container is held in the container receiving recess.

8. The multipurpose article holding tray of claim 7 wherein the container is generally box shaped and comprises, in combination: a bottom wall; side walls; end walls, with the side walls and end walls upstanding from the bottom wall, with the bottom wall having a size and shape for slidable receipt in the container receiving recess; and a partition extending between the side walls for dividing the container into a first chamber and a second chamber, with the partition extending above the side walls for forming a handle for the container.

9. The multipurpose article holding tray of claim 8 wherein the container further comprises, in combination: means in the second chamber for removably receiving a liquid container.

10. The multipurpose article holding tray of claim 9 wherein the container further includes a divider for dividing the second chamber into first and second subchambers, with the second subchamber including the liquid container receiving means.

11. The multipurpose article holding tray of claim 7 wherein the generally cylindrical portion has an axis; wherein the spherical portion includes a center; and wherein the generally spherical portion includes a flat surface generally perpendicular to the axis of the generally cylindrical portion, generally parallel to the connection of the generally cylindrical portion and the generally spherical portion, and on the opposite side an equidistant the center of the generally spherical portion from the connection of the generally spherical portion and the generally cylindrical portion.

12. Multipurpose article holding tray for use in an automobile body comprising, in combination: a traylike receptacle for holding articles, with the traylike receptacle including an open top; a transverse member extending from the open top of the traylike receptacle defining a container receiving recess having a size and shape; a container having a size and shape complementary to and for interfitting within the container receiving recess of the traylike receptacle for removably holding the container to the traylike receptacle against displacement by forces caused by movement or jarring of the automobile body, with the container receiving recess holding the container above the articles in the traylike receptacle allowing the traylike receptacle to hold articles therein while the container is held in the container receiving recess; and means for removably holding the traylike receptacle to the automobile body against displacement by forces caused by movement and jarring of the automobile body.

13. The multipurpose article holding tray of claim 12 further comprising, in combination: a marginal rim, with the transverse member connecting the marginal rim to the traylike receptacle, with the marginal rim including an upper end, with the transverse member extending from the marginal rim below the upper end to the open end of the traylike receptacle to define the container receiving recess.

14. The multipurpose article holding tray of claim 13 wherein the automobile body includes a tunnel hump; and wherein the multipurpose article holding tray further comprises, in combination: first convex lower marginal edges formed on the marginal rim adapted to rest upon the tunnel hump of the automobile body.

15. The multipurpose article holding tray of claim 14 wherein the marginal rim comprises, in combination: first and second end walls; first and second side walls, with the first convex lower marginal edges formed on the first and second end walls and adapted to rest upon the tunnel hump of the automobile body; and second convex lower marginal edges formed on the first and second side walls adapted to rest upon the tunnel hump of the automobile body, with the first and second convex lower marginal edges of the end walls and of the side walls being of different sizes to allow the traylike receptacle to accommodate various sizes of tunnel humps by positioning the traylike receptacle to straddle the tunnel hump between the first convex lower marginal edges of the end walls and by positioning the traylike receptacle to straddle the tunnel hump between the second convex lower marginal edges of the side walls.

* * * * *

UNITED STATES PATENT OFFICE
CERTIFICATE OF CORRECTION

Patent No. 4,821,931                              Dated April 18, 1989

Inventor(s) Richard E. Johnson

It is certified that error appears in the above-identified patent and that said Letters Patent is hereby corrected as shown below:

On the title page,
Under the Headings References Cited U.S. PATENT DOCUMENTS, please add the following:

```
--2,695,792  11/54  Rumsey
  2,897,974  08/59  Cook
  2,988,206  06/61  Olson
  3,163,287  12/64  Barnett
  3,245,522  04/66  Pearson
  3,311,276  03/67  Fromm
  3,561,589  02/71  Larkin, Jr. et al
  4,143,800  03/79  McCaffrey
  4,300,709  11/81  Page, Jr.
  4,303,109  12/81  Cohen
  4,418,733  12/83  Kallman--
```

Column 8, line 51, cancel "7" and substitute therefor --2--.

Column 8, line 58, cancel "an" and substitute therefor --and--.

Signed and Sealed this

Fourteenth Day of November, 1989

Attest:

JEFFREY M. SAMUELS

Attesting Officer                Acting Commissioner of Patents and Trademarks